United States Patent [19]

Lee et al.

[11] 4,133,982
[45] Jan. 9, 1979

[54] AC SUPERVISORY SIGNAL DETECTOR CIRCUIT

[75] Inventors: David Q. Lee, Chicago; Richard M. Rovnyak, Schaumburg, both of Ill.

[73] Assignee: GTE Automatic Electric Laboratories Incorporated, Northlake, Ill.

[21] Appl. No.: 864,051

[22] Filed: Dec. 23, 1977

[51] Int. Cl.² ............................................. H04M 7/00
[52] U.S. Cl. ........................... 179/18 AH; 179/18 FA
[58] Field of Search ........... 179/18 AH, 18 F, 18 FA, 179/84 A, 84 VF

[56] References Cited

U.S. PATENT DOCUMENTS

| 3,766,325 | 10/1973 | Hatfield et al. | 179/84 A |
| 3,842,216 | 10/1974 | Owen et al. | 179/84 L |
| 3,875,346 | 4/1975 | O'Dea et al. | 179/18 AH |
| 4,004,106 | 1/1977 | Yachabach et al. | 179/84 L |
| 4,046,970 | 9/1977 | Castleman | 179/84 L |

Primary Examiner—George G. Stellar

[57] ABSTRACT

An AC supervisory signal detector circuit for use in conjunction with a trunk circuit of a digital PABX telephone system interfacing with a central office providing for detection of relatively low frequency AC voltages which may be superimposed upon a DC bias voltage of either polarity. The circuit is equally responsive to various frequencies used in supervisory type signaling.

4 Claims, 1 Drawing Figure

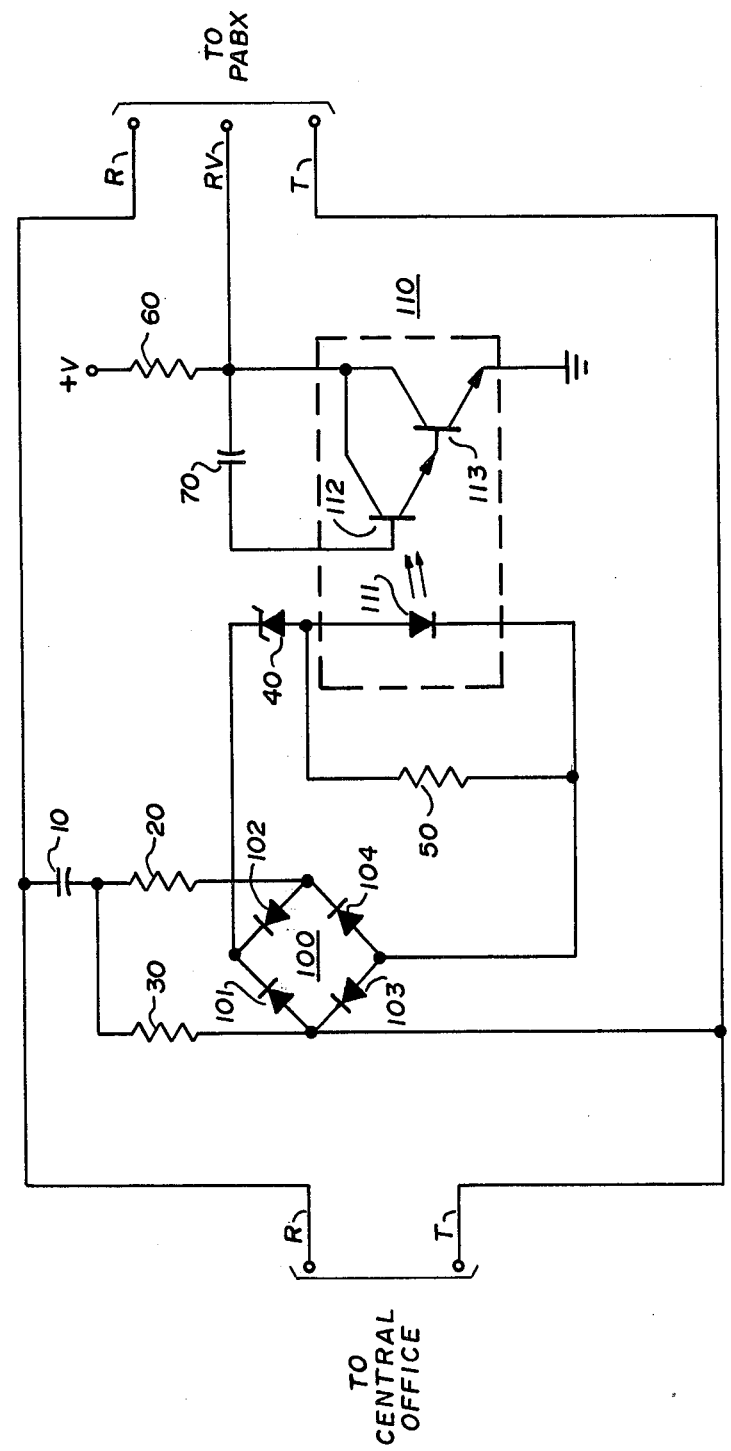

AC SUPERVISORY SIGNAL DETECTOR CIRCUIT

BACKGROUND OF THE INVENTION

1. Field of the Invention

The present invention relates to telephone trunk circuits and more particularly to an AC supervisory signal detector circuit for use in a digital private automatic branch exchange, to detect AC supervisory signals supplied by a central office. The present circuit designed for inclusion in a PABX trunk circuit, provides an indication to alert a called station of an incoming call.

2. Description of the Prior Art

In a telephone system it is necessary that a central office provide AC supervisory signals via a trunk circuit to a PABX. For example, these AC signals indicate to the PABX that it is about to receive an incoming call and that the central office requires recognition of the reception of the incoming call. This signaling is accomplished via application of a low frequency AC voltage superimposed upon a DC bias voltage of either polarity applied at the central office to the tip and ring leads of the trunk circuit.

Existing trunk circuits typically sense the application of such ringing voltages by the use of circuits specifically tuned to the frequency of the AC voltage to be detected and the polarity of the DC bias voltage. A disadvantage of these types of circuits is that a different circuit must be used for the detection of each frequency of AC supervisory signal which is applied.

A solution of these problems is taught by U.S. Pat. No. 3,849,605 issued to S. L. Russell, on Nov. 19, 1974, which demonstrates the use of a high voltage diode bridge rectifier circuit and an optical coupler including a light emitting diode and single photosensitive transistor. The output of this configuration requires latching in order for the detection of the continuity check level. Furthermore, the solid state continuity check circuit described in the Russell patent must be switched into and out of the tip and ring loop in order to avoid distortion during voice transmission thereby requiring relay contact control. Furthermore, this circuit exhibits another disadvantage which is the required use of high voltage diodes for the bridge circuit.

Therefore, it is an objective of the present invention to provide an AC supervisory signal detector circuit for detecting ringing type signals transmitted at a central office to a PABX in which the detector circuit is not required to be switched into and out of the tip and ring loop; the output of the detector circuit is impervious to spurious signals such as lightning or interruption by loop signaling of dialing; and the output does not require latching. The present invention also provides detection of multiple frequencies by the use of a single detector circuit.

SUMMARY OF THE INVENTION

The present invention consists of an AC supervisory signal detector circuit for use in a digital PABX trunk circuit for detecting ringing signal application at the central office and transmitting this detection to the PABX. The detector circuit includes a high impedance network and a low voltage diode bridge rectifier circuit connected between the tip and ring leads of a trunk circuit. A Zener diode is connected between the output of the bridge circuit and a light emitting diode of an optical coupler. The optical coupler further includes a pair of transistors in Darlington configuration. In addition, a capacitor connects the base of the first transistor of the Darlington pair to the output of the optical coupler.

When a sinusoidal (AC) supervisory signal is superimposed on a DC bias voltage applied at the central office to the tip and ring leads of the trunk circuit, the detector circuit responds with an output signal which monitors the application of the input sinusoidal supervisory signal. The output described will be produced regardless of the polarity of the DC bias voltage.

Due to the high impedance nature of the circuit, it remains permanently connected to the tip and ring leads of the trunk circuit. Therefore, there is no need for relay switching to disconnect this circuit during subsequent voice transmission. By inclusion of the above noted Zener diode and capacitor, fault conditions such as spurious transients or application of earth potentials, the output described herein will not respond with a false signal. In addition, the output is impervious to any dialing interruptions which occur on the trunk circuit.

DESCRIPTION OF THE DRAWING

The single sheet of drawings included herewith comprise a schematic diagram of an AC supervisory signal detector circuit embodying the principles of operation of the present invention.

DESCRIPTION OF THE PREFERRED EMBODIMENT

The drawing included schematically shows the AC supervisory signal detector circuit connected between the tip lead T and ring lead R of a trunk circuit connected between a PABX and a telephone central office. The supervisory signal detector circuit comprises a high impedance network including capacitor 10, resistor 20 (75,000 ohms) and resistor 30 (55,000 ohms) connected to the ring lead R of the trunk circuit. A low voltage diode bridge rectifier circuit 100 is connected between the high impedance network and Zener diode 40. The low voltage diode bridge rectifier circuit 100 includes diodes 101, 102, 103 and 104. Zener diode 40 is further connected to the common connection of resistor 50 and light emitting diode 111 of optical coupler 110. Resistor 50 (30,000 ohms) is connected to the common connection of diodes 103, 104 and 111. Capacitor 70 and photosensitive transistors 112 and 113 are connected to form output RV.

When the central office connects a sinusoidal (AC) supervisory signal, such as ringing, superimposed upon a DC bias voltage of either polarity to the tip lead T and the ring lead R of the trunk circuit, the alternating current (AC) component of the voltages will be permitted to pass to the detector circuit through capacitor 10, resistor 20, resistor 30 and low voltage diode bridge rectifier circuit 100 thereby producing a full wave rectified signal at Zener diode 40. Once the threshold voltage of Zener diode 40 is exceeded, current will flow from bridge rectifier circuit 100 through Zener diode 40 and light emitting diode 111 of optical coupler 110. By virtue of the conduction of current by light emitting diode 111, transistors 112 and 113 will conduct current resulting in output RV shifting from a value of logic "1" (first output level) to logic "0" (second output level). Capacitor 70 acts to smooth pulsations in the output current at output RV. In addition, capacitor 70 will prevent the output at RV from shifting levels due to spurious signals.

During voice transmission over tip lead T and ring lead R, the DC bias voltage component applied at the central office is dropped below the threshold of Zener diode 40 thereby, the supervisory signal detector circuit appears as a high impedance open circuit to the tip lead T and ring lead R.

Although, a preferred embodiment of the invention has been illustrated, and that form described in detail, it will be readily apparent to those skilled in the art that various modifications may be made therein without departing from the spirit of the invention or from the scope of the appended claims.

What is claimed is:

1. An AC supervisory signal detector circuit for use in a telephone system including at least first and second switching centers connected via a trunk circuit, said trunk circuit having first and second leads connecting said switching centers, bridge rectifier circuit means connected to said first and said second leads of said trunk circuit and an optical coupler including a light emitting diode and a photosensitive semiconductor device operable to generate an output signal level shift for transmission to said second switching center, the improvement comprising:

a high impedance network including a capacitor and first and second resistors, each of said resistors connected to a different input of said bridge rectifier circuit means and further connected in common to said second lead through said capacitor and said second resistor further connected to said first lead, operated to couple said supervisory signal detector circuit permanently to said trunk circuit;

current control means including a Zener diode series connected between a first output of said bridge rectifier circuit means and said light emitting diode and a resistor shunt connected across said light emitting diode and between said Zener diode and a second output of said bridge rectifier circuit means, operated to enable said supervisory signal detector circuit to function as an open circuit during voice transmission; and energy storage means connected to said optical coupler operated in response to application of an alternating current supervisory signal by said first switching center to said trunk circuit to shift said output signal from a first level to a second level.

2. An AC supervisory signal detector circuit as claimed in claim 1 wherein: said photosensitive semiconductor device includes a pair of transistors in Darlington configuration.

3. An AC supervisory signal detector circuit as claimed in claim 1 wherein: said bridge rectifier means consists of a plurality of low voltage diodes.

4. An AC supervisory signal detector circuit as claimed in claim 1 wherein: said energy storage means is operated to prevent said output signal from shifting to said second level in response to spurious signals.

* * * * *